(12) United States Patent
De La Serna Gonzalez et al.

(10) Patent No.: US 12,384,489 B2
(45) Date of Patent: Aug. 12, 2025

(54) OPERATING DEVICE AND ELECTRIC BICYCLE

(71) Applicant: Mahle International GmbH, Stuttgart (DE)

(72) Inventors: Marco Antonio De La Serna Gonzalez, Palencia (ES); Jaume Jumbert, Juneda (ES); Yaroslav Rakhnenko, Palencia (ES); Alberto Jesus Rico Sanz, Valladolid (ES)

(73) Assignee: Mahle International GmbH (DE)

( * ) Notice: Subject to any disclaimer, the term of this patent is extended or adjusted under 35 U.S.C. 154(b) by 671 days.

(21) Appl. No.: 17/837,855

(22) Filed: Jun. 10, 2022

(65) Prior Publication Data

US 2023/0002004 A1   Jan. 5, 2023

(30) Foreign Application Priority Data

Jun. 10, 2021   (DE) .................. 102021205911.2

(51) Int. Cl.
| | | |
|---|---|---|
| *B62M 6/50* | (2010.01) | |
| *B62J 45/41* | (2020.01) | |
| *B62J 45/413* | (2020.01) | |
| *B62J 45/414* | (2020.01) | |
| *B62J 50/21* | (2020.01) | |

(Continued)

(52) U.S. Cl.
CPC .............. *B62M 6/50* (2013.01); *B62J 45/41* (2020.02); *B62J 45/413* (2020.02); *B62J 45/414* (2020.02); *B62J 50/22* (2020.02); *B62J 50/225* (2020.02); *B62K 23/02* (2013.01); *B62M 6/90* (2013.01)

(58) Field of Classification Search
CPC ... B62M 6/50; B62M 6/90; B62M 6/40; B62J 45/41; B62J 45/413; B62J 45/414; B62J 50/22; B62J 50/225; B62K 23/02; B62K 19/30
See application file for complete search history.

(56) References Cited

U.S. PATENT DOCUMENTS

| | | | | |
|---|---|---|---|---|
| 2007/0046215 A1* | 3/2007 | Hung | ................... | F21L 4/08 |
| | | | | 315/185 S |
| 2015/0066267 A1* | 3/2015 | Chun | ................... | B60L 3/04 |
| | | | | 180/206.3 |

(Continued)

FOREIGN PATENT DOCUMENTS

| | | |
|---|---|---|
| DE | 102013209470 A1 | 11/2014 |
| DE | 102015200179 A1 | 7/2016 |

OTHER PUBLICATIONS

English abstract for DE-102013209470.

(Continued)

*Primary Examiner* — Omeed Alizada
(74) *Attorney, Agent, or Firm* — Fishman Stewart PLLC

(57) ABSTRACT

An operating device for an electric bicycle may include a control/regulation device and a lighting unit. The lighting unit may include at least one electrical lighting element for emitting light. The at least one lighting element may be electrically connected to the control/regulation device such that the at least one lighting element is activatable via the control/regulation device. Via the control/regulation device, a light code with at least one of active and inactive light elements of the lighting unit is providable to visualize at least one momentary state of the electric bicycle.

20 Claims, 2 Drawing Sheets

(51) Int. Cl.
    *B62J 50/22*       (2020.01)
    *B62K 23/02*       (2006.01)
    *B62M 6/90*       (2010.01)

(56) References Cited

U.S. PATENT DOCUMENTS

| | | | | |
|---|---|---|---|---|
| 2016/0031525 | A1* | 2/2016 | Craven | B62K 25/02 |
| | | | | 180/206.7 |
| 2016/0339978 | A1* | 11/2016 | Braucht | H05B 45/10 |
| 2023/0062161 | A1* | 3/2023 | Wakuta | B62K 23/02 |
| 2024/0109618 | A1* | 4/2024 | Sessions | B60L 50/64 |
| 2024/0262457 | A1* | 8/2024 | Nomura | B62J 45/411 |

OTHER PUBLICATIONS

English abstract for DE-102015200179.
German Search Report for DE-102021205911.2, mailed Apr. 19, 2022.
Fazua Benutzerhandbuch.
Fazua Remote Fx.

\* cited by examiner

OPERATING DEVICE AND ELECTRIC BICYCLE

CROSS-REFERENCE TO RELATED APPLICATIONS

This application claims priority to German Patent Application No. DE 10 2021 205 911.2, filed on Jun. 10, 2021, the contents of which is hereby incorporated by reference in its entirety.

TECHNICAL FIELD

The invention relates to an operating device, in particular a man-machine interface, for an electric bicycle, in particular for a pedelec. The invention further relates to such an electric bicycle, in particular a pedelec.

BACKGROUND

For some time now, electric bicycles, in particular pedelecs, have been equipped with operating devices, such an operating device usually serving to signal a state of the electric bicycle to a rider of the electric bicycle. Often, however, such conventional operating devices can only visualize a single state of the electric bicycle. Also, the clarity of the visualization of such a state of the electric bicycle by means of conventional control/regulation devices is often problematic.

SUMMARY

It is therefore an object of the present invention to show new ways for operating devices as well as for electric bicycles with such an operating device, which in particular take into account the aforementioned problem.

This problem is solved by the subject-matter of the independent claim(s). Preferred embodiments are the subject matter of the dependent patent claim(s).

Accordingly, the basic idea of the invention is to equip an operating device for an electric bicycle with a light unit comprising at least one electric light element which can be activated individually by means of a control/regulation device of the operating device in such a way that a light code can be generated by means of the control/regulation device, by means of which a momentary state of the electric bicycle can be visualized for its rider.

Advantageously, the at least one current state of the electric bicycle can be visualized for its rider in a particularly clear manner by means of such a light code. It goes without saying that the rider must recognize the illuminated code and decipher its meaning. At the same time, the illuminated code makes it possible to visualize various characteristics or gradations of such a momentary state for the rider.

An operating device according to the invention for an electric bicycle, in particular for a pedelec, comprises a control/regulation device. The operating device can be a man-machine interface, which is also familiar to a person skilled in the art under the designation "man-machine interface". The operating device comprises a light unit which comprises at least one electrical light element for emitting light, which is electrically connected to the control/regulation device in such a way that each light element can be activated separately by means of the control/regulation device for emitting light. In this case, the control/regulation device can be used to generate a light code, in particular an animated light code, with active or/and inactive light elements of the light unit, by means of which at least one current state of the electric bicycle can be visualized for its rider. As already explained above, a particularly clear visualization of the at least one momentary state of the electric bicycle can thus be realized.

According to a preferred embodiment the lighting unit which comprises at least two electrical lighting elements for emitting light which can be activated separately by means of the control/regulation device for emitting the light.

Expediently, the light unit is configured in the form of a strip and comprises a plurality of light elements arranged next to one another in a row. This makes it possible to further increase the clarity of the visualization. In addition, the service device with such a lighting unit is particularly narrow, which simplifies its accommodation on a frame of the electric bicycle.

In a preferred further development of the operating device, the control/regulation device can be connected to a bus system, in particular to a field bus, of the electric bicycle, so that the control/regulation device can communicate in a data-transmitting manner via the bus system with further components of the electric bicycle connected to the bus system. In this case, a (first) momentary state corresponds to a momentary operating state of at least one of the components of the electric bicycle connected to the bus system. Advantageously, information about the current operating state of the components connected to the bus system can thus be supplied to the rider by means of the visualization, so that the rider can adapt his riding behavior to it.

In a further advantageous further development of the operating device, the latter comprises a data transmission device for wireless communication with an electronic device, in particular one that can be carried by the rider, which is electrically connected to the control/regulation device, so that the control/regulation device can communicate with the electronic device by means of the data transmission device. In this case, a (second) instantaneous state corresponds to an instantaneous operating state of the electronic device. Advantageously, sensor technology installed in the electronic device can thus be used without sensor technology of the same function having to be installed in the electric bicycle itself.

The data transmission device could be configured in such a way that it supports "Blue-tooth-Low-Energy" as the communication standard for wireless data transmission communication with the electronic device. This communication standard is also supported by most electronic devices available on the market.

According to a further preferred further development of the operating device, the same comprises an inertial measuring device which is electrically connected to the control/regulation device, so that the control/regulation device can access measurement data generated by the inertial measuring device, a (third) instantaneous state being determined by this measurement data. Advantageously, information about the measurement data can thus be supplied to the rider by the visualization.

In a further advantageous further development of the operating device, it is provided that the operating device comprises an input unit that can be actuated by the rider, which preferably has an electromechanical button, which is electrically or wirelessly connected to the control/regulation device. In this case, the input unit can be used to select which of at least two instantaneous states of the electric bicycle is visualized by means of the illuminated code. The rider can therefore advantageously obtain particularly precise information about an overall state, which is composed of the momentary states, by having the individual momentary states visualized specifically one after the other by means of the illuminated code.

According to a further advantageous further development of the operating device, the same comprises an electronic memory, in particular a flash memory, which is electrically connected to the control/regulation device so that the control/regulation device can access the electronic memory by means of read or write access. Information can thus be prestored on the electronic memory, which the control/regulation device can use in determining the current state of the electric bicycle.

According to a further preferred further development of the control/regulation device, the control/regulation device is capable of machine learning, whereby learned information can be written to the electronic memory by means of the control/regulation device. In this way, information prestored on the control/regulation device, which can be used by the control/regulation device in determining the momentary state of the electric bicycle, can be successively made more precise automatically.

Expediently, each light element is configured to selectively emit light of one of at least two colors when active. In this case, the color or brightness of the light emitted by the respective luminous element can be selected by means of the control/regulation device. The light code thus receives an additional coding level in the form of a color coding or brightness.

In a further preferred further development of the operating device, the latter may comprise an additional lighting element which is set apart from the lighting unit and is electrically connected to the control/regulation device in such a way that it could be activated separately by means of the control/regulation device, the additional lighting element or the light emitted by it being part of the light code. In this way, the illuminated code can be provided with yet another additional coding level.

According to a further advantageous further development of the operating device, the light unit extends along an extension direction along which the light elements of the row are lined up, in particular without gaps between them, the input unit being arranged along the extension direction in alignment with the light unit. This permits a particularly clear visualization of the at least one state of the electric bicycle.

In a further preferred further development of the operating device, it is provided that the operating device comprises a housing, in particular with or made of plastic, the housing being at least partially receivable in a recess of a tube, preferably of a top tube, of a frame of the electric bicycle, in particular with a flange section of the housing resting on the tube. Such a control/regulation device can be particularly securely fastened to the frame of the electric bicycle.

The invention also relates to an electric bicycle, in particular a pedelec, with a control/regulation device according to the invention as described above. The advantages of the operating device according to the invention already mentioned are also transferred to the electric bicycle according to the invention. The electric bicycle comprises an electric drive, which is drive-connected to a wheel of the electric bicycle, and an electric storage device for supplying the electric drive with electric power. The control unit is electrically connected to the electric drive and/or the electric accumulator, in particular by means of a bus system of the electric bicycle. A current status of the electric bicycle, which can be visualized by means of the illuminated code for a rider of the electric bicycle, corresponds to a current operating state of the electric drive and/or the electric accumulator.

In an advantageous further development of the electric bicycle, the same comprises a handlebar which has a vibration device by means of which a haptic vibration signal or acoustic signal can be supplied to the rider of the electric bicycle. The vibration device is connected in a data-transmitting manner to the control/regulation device of the operating device, in particular by means of the bus system, so that the rider can be supplied with information, in particular about at least one state of the electric bicycle, by means of the vibration signal in addition to the illuminated code. Thus, the rider can advantageously be provided with information about the state of the electric bicycle even if current traffic conditions prevent the rider from looking at the operating device.

Further important features and advantages of the invention will be apparent from the sub-claims, from the drawings and from the accompanying figure description based on the drawings.

It is understood that the above features and those to be explained below can be used not only in the combination indicated in each case, but also in other combinations or on their own, without departing from the scope of the present invention.

Preferred examples of embodiments of the invention are shown in the drawings and are explained in more detail in the following description, wherein the same reference signs refer to identical or similar or functionally identical components.

BRIEF DESCRIPTION OF THE DRAWINGS

The following are shown schematically.

DETAILED DESCRIPTION

Figure 1:
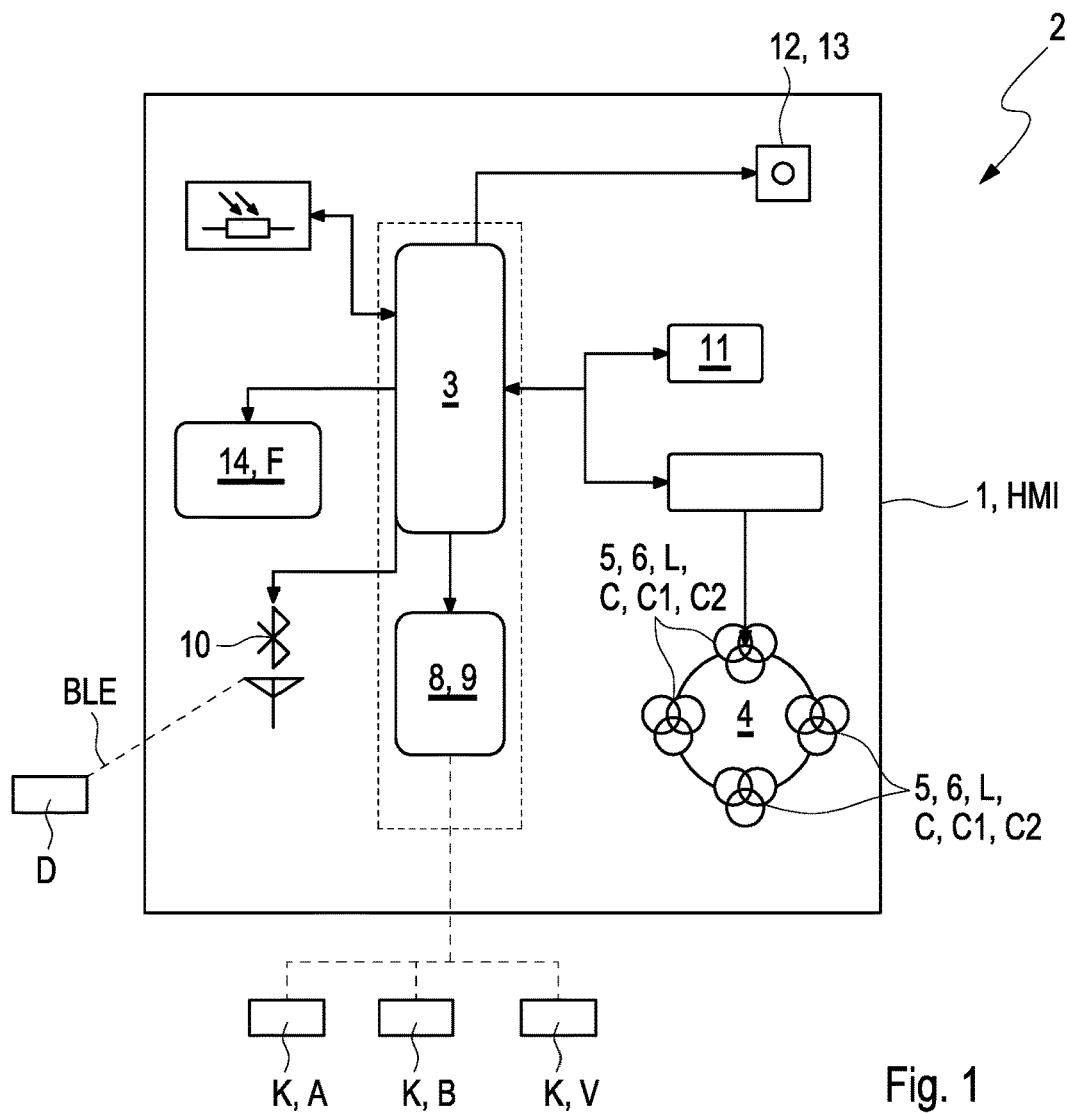
FIG. 1 shows an example of a functional diagram of an electric bicycle according to the invention with an example of an operating device according to the invention.

FIG. 1 schematically shows a functional diagram of an example of an electric bicycle 2 according to the invention, which comprises an operating device 1 according to the invention, which is also shown as an example. The operating device 1 may be a human-machine interface HMI, also known to those skilled in the art as a "human-machine interface". The electric bicycle 2 may be a pedelec. The operating device 1 comprises a control/regulation device 3. Furthermore, the operating device 1 comprises a light unit 4. The light unit 4 comprises at least two electric light elements 5 for emitting light L. Each of the light elements 5 may comprise one or more LEDs. The lighting elements 5 are electrically connected to the control/regulation device 3 in such a way that each lighting element 5 can be activated separately by means of the control/regulation device 3 for emitting the light L. The lighting elements 5 can therefore be individually controlled by means of the control/regulation device 3. A light code 6 with active as well as—alternatively or additionally—inactive light elements 5 of the light unit 4 can be generated by means of the control/regulation device 3. The light code 6 is animated, for example, i.e. the light code 6 can be formed by light elements 5 changing in time between their active and inactive state, whereby the change can encode information. By means of the illuminated code 6, at least one momentary state of the electric bicycle 2 can be visualized for its rider. The rider can read the illuminated code 6.

Figure 2:
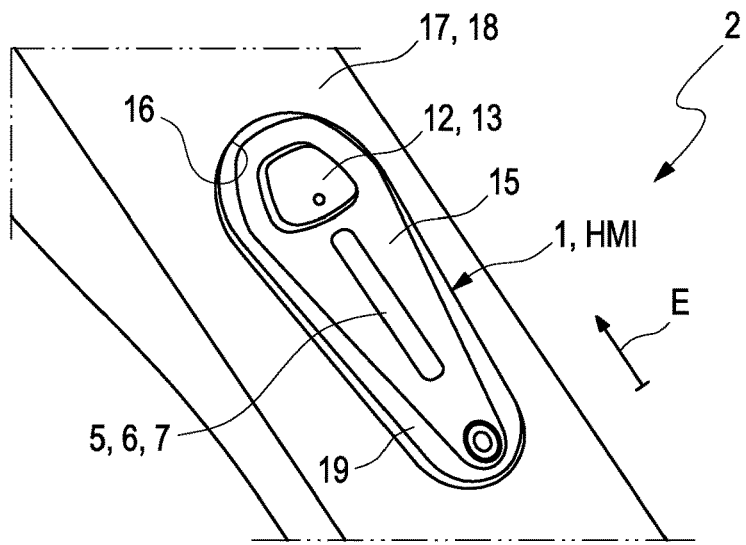
FIG. 2 shows, in perspective, a detail of the electric bicycle of FIG. 1.

In FIG. 2, the electric bicycle 2 with the operating device 1 of FIG. 1 is shown in a partial perspective view. It can be seen that the light unit 4 is strip-shaped and comprises several light elements 5 arranged next to each other in a row 7.

FIG. 1 shows that the control/regulation device 3 is connected to a bus system 8 of the electric bicycle 2. The bus system 8 of the electric bicycle 2 can be a field bus 9 of the electric bicycle 2. In this case, the control/regulation device 3 is connected to the bus system 8 in such a way that the control/regulation device 3 can communicate in a data-transmitting manner via the bus system 8 with further components K of the electric bicycle 1 connected to the bus system 8. In this context, a first momentary state corresponds to a momentary operating state of at least one of the components K of the electric bicycle 2 connected to the bus system 8. Such a component K can be an electrical storage device B of the electric bicycle 2, in which case the first momentary state can be a charging process of the electrical storage device B.

According to FIG. 1, the operating device 1 comprises, for example, a data transmission device 10 for wireless communication with an electronic device D. The electronic device D may be carried by the rider of the electric bicycle 2. The electronic device D may be a smartphone or a smartwatch. The data transmission device 10 is electrically connected to the control/regulation device 3, so that the control/regulation device 3 can communicate wirelessly with the electronic device D in a data-transmitting manner by means of the data transmission device 10. In this case, a second instantaneous state, which can be visualized by means of the light code 6, corresponds to an instantaneous operating state of the electronic device D. For example, recourse can be made to sensor technology installed in the electronic device D, the sensor data of which can indirectly describe the second instantaneous state of the electric bicycle 2. For example, the device may comprise a GPS sensor by means of which position data can be determined that at least indirectly also reflect the position of the electric bicycle 2. Consequently, the second instantaneous state of the electric bicycle 2 may be determined by the position of the electric bicycle 2 on a virtual map or, for example, by an instantaneous distance of the electric bicycle 2 to a predetermined destination with a known position. The data transmission device 1 is configured to support "Bluetooth-Low-Energy" as a communication standard for data-transmitting communication with the electronic device D.

It can also be seen from FIG. 1 that the control/regulation device 1 comprises an inertial measurement device 11. The inertial measurement device 11 may comprise a gyro sensor. The inertial measurement device 11 may comprise at least one acceleration sensor. The inertial measurement device 11 may comprise at least one rotation rate sensor. The inertial measurement device 11 may form or be part of an inertial navigation system. The inertial measurement device 11 is electrically connected to the control/regulation device 3 in such a way that the control/regulation device 3 can access measurement data generated by the inertial measurement device 11. In this case, a third instantaneous state, which can be visualized by means of the light code 6, is determined by the measurement data. The third instantaneous state of the electric bicycle 2 can therefore be, for example, an instantaneous acceleration or an instantaneous speed of the electric bicycle 2.

It further follows from FIG. 1 that the operating device 1 comprises an input unit 12 which can be operated by the rider of the electric bicycle 2. The input unit 12 can be manually operated by the rider of the electric bicycle 2. The input unit 12 has, for example, an electromechanical push-button 13. The input unit 12 is electrically connected to the control/regulation device 3. By means of the input unit 12, the rider can select which of at least two instantaneous states of the electric bicycle 2 is visualized or is to be visualized by means of the illuminated code 6.

According to FIG. 1, the operating device 1 further comprises an electronic memory 14. The electronic memory 14 may comprise a flash memory F or may be a flash memory F. The electronic memory 14 is electrically connected to the input unit 12. The electronic memory 14 is electrically connected to the control/regulation device 3, so that the control/regulation device 3 can access the electronic memory 14 by means of read or write access. For example, the control/regulation device 3 is capable of machine learning, whereby learned information can be written to the electronic memory 14 by the control/regulation device 3. Thus, the control/regulation device 3 can derive and store measures based on an evaluation of past states of the electric bicycle 2, as a result of which measures the visualization of the illuminated code 6 can be automatically adjusted. For example, by evaluating past states of the electric bicycle 2, the control/regulation device 3 can learn under which conditions the electric storage unit B of the electric bicycle 2 empties particularly quickly and then, by automatically adapting the visualization of the illuminated code 6, signal to the rider of the electric bicycle 2 how he should behave in order to avert said conditions and thus to be able to make the best possible use of a range of the electric storage unit B. However, a variety of further examples of machine learning processes of the control/regulation device 3 are also conceivable.

Figure 3:
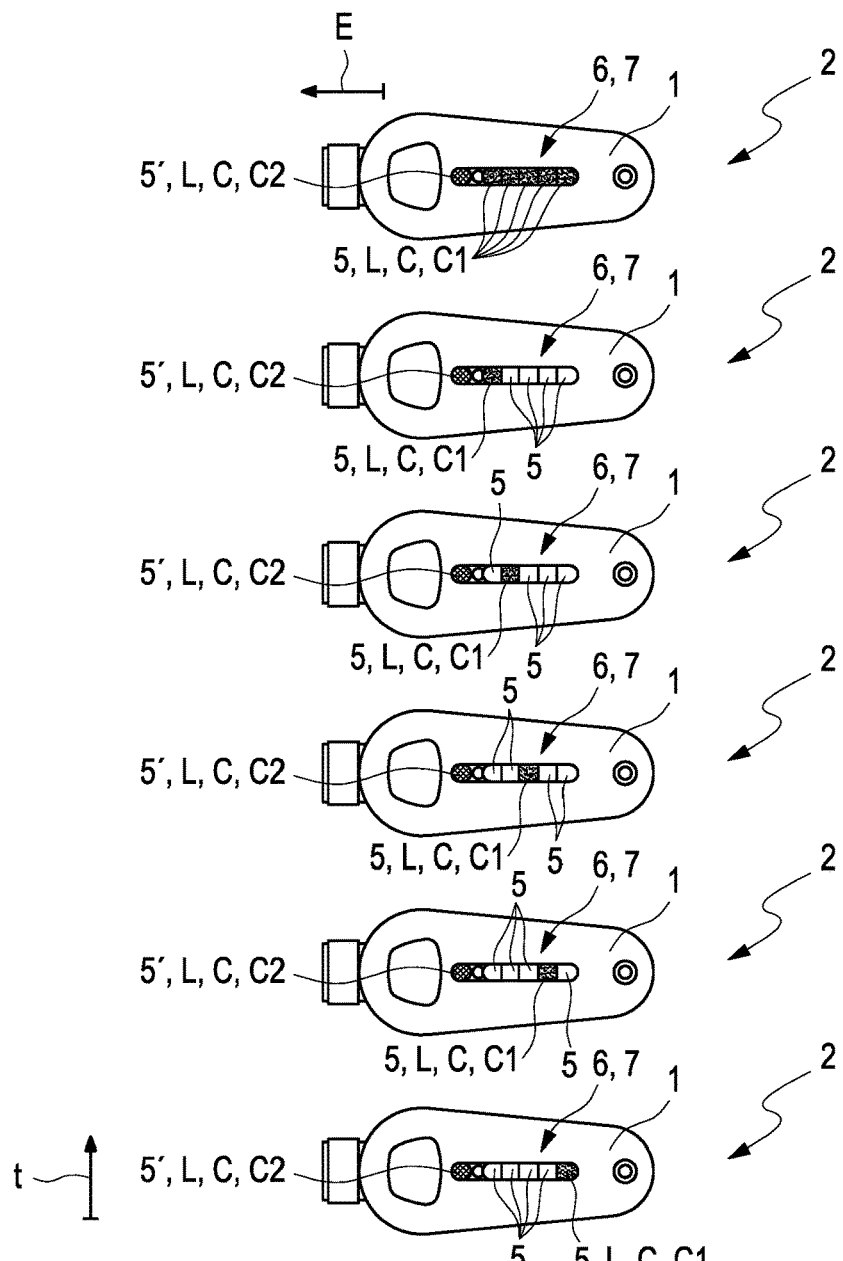
FIG. 3 shows a bird's-eye view of the operating device of the electric bicycle of FIGS. 1 and 2, which is in a first momentary state.

FIG. 3 shows the control/regulation device 1 of the electric bicycle 2 of FIGS. 1 and 2 in a bird's-eye view image sequence. On the basis of the image sequence of FIG. 3, the visualization of the at least one state by means of the animated light code 6 of the control/regulation device 1 can be understood. The individual images of the image sequence of FIG. 3 are to be understood as snapshots of the control/regulation device 1, which follow one another in a film-like manner over time t, while the control/regulation device 1 visualizes the first state of the electric bicycle 2 by means of the animated illuminated code 6. As already mentioned above, the first momentary state may be a charging process of the electric storage device B of the electric bicycle 2. Each light element 5 of the control/regulation device 1, when active, can optionally emit light L with one of at least two colors C, C1, C2. In this case, the color C, C1, C2 of the light L emitted by the respective lighting element 5 can be selected by means of the control/regulation device 3. Also, the brightness of the light L emitted by the respective light element 5 can be adjusted by the control/regulation device 3. The selection of the color C, C1, C2 thus forms an additional coding level of the light code 6 in the form of a color coding for the time sequence of the activation or deactivation of the individual light elements 5. The operating device 1 of FIG. 3 comprises an additional lighting element 5' set off from the lighting unit 4, which is electrically connected to the control/regulation device 3 in such a way that it can be activated separately, i.e. individually, by means of the control/regulation device 3. In this case, the additional light element 5' is part of the illuminated code 6, i.e. the illuminated code 6 can be extended by a further coding level by means of the additional light element 5'.

Figure 4:
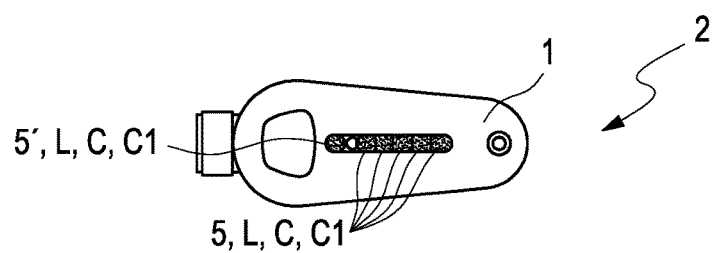
FIG. 4 shows a plan view of the operating device of the electric bicycle of FIGS. 1 to 3, which is in a second momentary state.

In FIG. 4, the operating device 1 of the electric bicycle 2 of FIGS. 1 to 3 is shown in a top view. While the sequence of images in FIG. 3 visualizes the animated light code 6 for a charging process of the electrical storage device B of the electric bicycle 2 as the latter's first momentary state, the light code 6 in FIG. 4 signals a fully charged state of the electrical storage device B as the momentary state of the electric bicycle 2.

Referring to FIG. 2, the control/regulation device 1 comprises a housing 15. The housing 15 may comprise or be made of a plastic material. The housing 15 may partially or completely surround the other components of the operating device 1. In the example of FIG. 2, the housing 15 is at least partially received in a recess 16 of a top tube 17 of a frame 18 of the electric bicycle 2. Thereby, the housing 15 rests with a flange section 19 of the housing 15 on the top tube 17.

FIG. 1 shows that the electric bicycle 2 comprises, in addition to the operating device 1, an electric drive A which forms a component K of the electric bicycle 2. The electric drive A is drive-connected to a wheel of the electric bicycle 2. Thereby, the electric storage B of the electric bicycle 2 serves to supply the electric drive A with electric power. The control unit 1 is electrically connected to the drive A and alternatively or additionally to the electrical storage unit B—in the example of FIG. 1 both to the electrical drive A and to the electrical storage unit B.

The electrical storage unit B is connected to the electrical drive A and to the electrical storage unit B. For example, the electric drive A or the electric memory B of the electric bicycle 2 is connected to the control unit 1 by means of the bus system 8 of the electric bicycle 2. In this case, a momentary state of the electric bicycle 2, which can be visualized by means of the light code 6 for a rider of the electric bicycle 2, corresponds to a momentary operating state of the electric drive A or of the electric storage device B. For example, the electric bicycle 2 comprises a handlebar having a vibration device V. The vibration device V may form a component K of the electric bicycle 2. By means of the vibration device V, a haptic vibration signal can be supplied to the rider of the electric bicycle 2. The vibration device V is connected in a data-transmitting manner to the control/regulation device 3. The vibration device V can be connected to the control/regulation device 3 in a data-transmitting manner by means of the bus system 8. In this case, the vibration device V is connected to the control/regulation device 3 in such a way that the rider can be supplied with information—for example about at least one state of the electric bicycle 2—by means of the vibration signal in addition to the illuminated code 6.

The invention claimed is:

1. An operating device for an electric bicycle, comprising:
   a control/regulation device;
   a lighting unit including a plurality of electrical lighting elements for emitting light, the plurality of lighting elements electrically connected to the control/regulation device such that the plurality of lighting elements are activatable via the control/regulation device for emitting the light;
   wherein, via the control/regulation device, an animated light code with active and/or inactive lighting elements of the lighting unit is providable to visualize at least one of a plurality of momentary states of the electric bicycle; and
   wherein the plurality of momentary states includes:
      a first momentary state corresponding to a momentary operating state of an electric bicycle component; and
      a second momentary state corresponding to a momentary operating state of a user-carried electronic device.

2. The operating device according to claim 1, wherein:
   the control/regulation device is configured to activate the plurality of lighting elements separately for emitting the light; and/or
   the lighting unit is configured as a strip in which the plurality of light elements are arranged next to one another in a row.

3. The operating device according to claim 1, wherein:
   the control/regulation device is configured to connect to a bus system of the electric bicycle such that the control/regulation device is communicative in a data-transmitting manner, via the bus system, with at least one further component of the electric bicycle that is connected to the bus system; and
   at least one of the plurality of momentary states corresponds to an instantaneous operating state of the at least one further components.

4. The operating device according to claim 1, further comprising a data transmission device for wireless communication with the user electronic device, wherein:
   the data transmission device is electrically connected to the control/regulation device such that the control/regulation device is communicative in a data-transmitting manner with the user electronic device via the data transmission device; and
   at least one of the plurality of momentary states corresponds to an instantaneous operating state of the user electronic device.

5. The operating device according to claim 4, wherein the data transmission device is configured to support "Bluetooth Low Energy" as a communication standard for data-transmitting communication with the user electronic device.

6. The operating device according to claim 1, further comprising an inertial measurement device, wherein:
   the inertial measurement device is electrically connected to the control/regulation device such that measurement data obtained by the inertial measurement device is accessible to the control/regulation device; and
   at least one of the plurality of momentary states corresponds to the measurement data.

7. The operating device according to claim 1, further comprising an input unit, wherein:
   the input unit is actuatable by a rider and is electrically connected and/or wirelessly connected to the control/regulation device; and
   via the input unit, one of the plurality of momentary states is selectable for visualization via the animated light code.

8. The operating device according to claim 1, further comprising an electronic memory electrically connected to the control/regulation device such that the electronic memory is accessible to the control/regulation device via read access and/or write access.

9. The operating device according to claim 8, wherein the control/regulation device is configured for machine learning and to write learned data to the electronic memory.

10. The operating device according to claim 1, wherein:
at least one lighting element of the plurality of lighting elements is configured to selectively emit light with one of at least two colors, at an adjustable brightness; and
a color and a brightness of the emitted light is selectable via the control/regulation device.

11. The operating device according to claim 1, further comprising an additional lighting element offset from the lighting unit, wherein:
the additional lighting element is electrically connected to the control/regulation device such that the additional lighting element is separately activatable via the control/regulation device; and
the additional light element is part of the animated light code.

12. The operating device according to claim 7, wherein:
the lighting unit is configured as a strip in which the plurality of lighting elements are arranged next to one another in a row extending in an extension direction;
the lighting unit extends along the extension direction; and
the input unit is arranged along the extension direction in alignment with the lighting unit.

13. The operating device according to claim 1, further comprising a housing, wherein the housing is at least partially receivable in a recess of a tube of a frame of the electric bicycle.

14. An electric bicycle, comprising:
a wheel;
an operating device;
an electric drive drive-connected to the wheel;
an electric storage device for supplying the electric drive with electric power;
the operating device including:
a control/regulation device; and
a lighting unit including a plurality of electrical lighting elements for emitting light, the plurality of electrical lighting elements electrically connected to the control/regulation device such that the plurality of lighting elements are activatable via the control/regulation device;
wherein, via the control/regulation device, an animated light code with active and/or inactive lighting elements of the lighting unit is providable to visualize at least one of a plurality of momentary states;
wherein the operating device is electrically connected to the electric drive and/or the electric storage device; and
wherein the plurality of momentary states includes:
a first momentary state corresponding to a momentary operating state of the electric drive;
a second momentary state corresponding to a momentary operating state of the electric storage device; and
a third momentary state corresponding to a momentary operating state of a user-carried electronic device.

15. The electric bicycle according to claim 14, further comprising:
a handlebar; and
a vibration device connected to the handlebar, the vibration device configured to provide a haptic vibration signal and/or an acoustic signal; and
wherein the vibration device is connected in a data-transmitting manner to the control/regulation device such that information is suppliable via the haptic vibration signal and/or the acoustic signal.

16. The electric bicycle according to claim 14, further comprising a bus system electrically connecting the operating device to the electric drive and to the electric storage device.

17. The electric bicycle according to claim 16, further comprising at least one additional component, wherein:
the at least one additional component and the control/regulation device are communicatively connected to one another via the bus system; and
the plurality of momentary states includes a third momentary state corresponding to a momentary operating state of the at least one further component.

18. The electric bicycle according to claim 14, further comprising a frame, wherein:
the frame includes a tube having a recess;
the operating device further includes a housing having a flange section; and
the operating device is arranged in the recess of the tube such that the flange section of the housing rests on a top of the tube.

19. The operating device according to claim 6, wherein:
the inertial measurement device includes an acceleration sensor and/or a rotation rate sensor; and
the measurement data includes an acceleration of the electric bicycle and/or a speed of the electric bicycle.

20. An operating device for an electric bicycle, comprising:
a controller; and
a lighting unit including a plurality of lights, the lighting unit electrically connected to the controller such that the plurality of lights are separately activatable via the controller;
wherein the controller is configured to selectively activate the plurality of lights to provide an animated light code that visualizes at least one of a plurality of momentary states; and
wherein the plurality of momentary states includes:
a first momentary state corresponding to a momentary operating state of an electric bicycle component;
a second momentary state corresponding to a momentary operating state of a user-carried electronic device; and
a third momentary state corresponding to measurement data.

* * * * *